Patented Aug. 8, 1933

1,921,991

UNITED STATES PATENT OFFICE 1,921,991

ALCOHOLIC FERMENTATION PROCESS AND PRODUCT THEREOF

Frank M. Hildebrandt, Baltimore, Md., assignor to U. S. Industrial Alcohol Co., New York, N. Y., a Corporation of West Virginia No Drawing. Application November 20, 1929
Serial No. 408,677

11 Claims. (Cl. 195—20)

The invention relates to alcohol manufacture and to a method of freeing alcohol fermentation solutions, more especially concentrated solutions, such as cane molasses solutions, from yeast and solids, and for rendering the solids so recovered suitable for use as a feed or for fertilizer.

The solid material that settles from such alcohol fermentation solutions is usually run through the stills along with the liquid portion of the spent solution. This solid waste is made up of sediment from the molasses and yeast cells from the fermented solutions.

It is desirable to separate as much solid material as possible from the spent solution before running this solution to the stills. This prevents to a large extent the clogging of the piping and of the distillation apparatus. Such a separation is especially desirable where the beer still waste is concentrated in evaporators following the distillation for alcohol recovery, in which case solids present are deposited in the evaporators and are particularly troublesome when they cake on the tube surface, since this cuts down the heat transfer and correspondingly reduces the evaporator efficiency.

Separation of the solids from the beer, in accordance with this invention, involves the concentration of the solids into a relatively small volume. This is accomplished by employing a flocculating yeast culture for the fermentation, which flocculating yeast culture brings down the sludge, thereby freeing the spent solution from solids to such a degree that the difficulties referred to in connection with subsequent handling and treatment of the liquid are overcome or very largely eliminated. In addition to this, however, a particular purpose is to obtain a residue having an important commercial value as or for stock or chicken food or fertilizer. The ordinary fermenter settlings are not usable in this way, but with my process the presence of a considerable amount of yeast in the deposits makes it excellent material for such purposes. This requires another step, namely the dehydration of the settlings rich in nitrogenous matter to obtain a residue which can be marketed.

A mixed culture of yeast and bacteria is employed in this process for the production of alcohol in place of pure yeast, the bacteria associated with the yeast causing a flocculation and settling of the yeast cells. In the process of settling, the flocculating yeast carries with it solids from the molasses solution which increase the volume of the sediment normally present.

The other function of the bacteria is to cause the yeast to settle and thus add to the sediment in the bottom of the tubs the nitrogenous constituents which make it a product sufficiently valuable to be worth recovering. The use of such a culture as described has a very definite effect on the composition of the settled-out solids as the following data from large-scale operations will show:

(a) Nitrogen content of dried residue using a non-flocculating yeast—0.60% on dry basis.

(b) Nitrogen content of dried residue using a flocculating years—5.72% on dry basis.

The residue (c) represents only the molasses settlings and is of no value either as food or fertilizer. Moreover, the purpose of removing the solids has not been accomplished since the yeast is still in suspension and will clog the distillation and evaporation apparatus, as has been previously noted. The residue (b) is, however, rich in yeast, possesses a market value, and this residue represents a much greater percentage of the total solids in the spent solution than does (a).

Having removed the residue rich in nitrogen and representing a large proportion of the total solids, it is necessary to reduce its moisture content. As found in the bottom of the fermenters, the residue contains about 80% moisture. The reduction of the moisture content may be accomplished by direct drying or by filter-pressing.

By filtering, the alcohol-containing liquid around the particles may be passed to the stills for recovery and a cake obtained which is sufficiently dry for further treatment. If it is attempted to filter-press this material, as is usually done in yeast recovery from fermentation solutions, it will be found that the thick settlings clog the filter. This is due to the fact that the yeast after fermentation in a concentrated molasses solution, i. e. of 16°–25° Brix is no longer turgid, and under the pressure of the filter the cells collapse and seal the cloth. By re-fermenting a given volume of the residue in an equal volume of a dilute molasses solution (from 2°–4° Brix), the yeast cells are enabled to take up water osmotically and thus become turgid. The refermented residue may then be filter-pressed with or without a filter aid and a friable cake obtained containing from 60%–70% moisture. The re-fermentation must be carried out at a temperature suitable to yeast activity (25° C.–35° C.) and other precautions taken well-known to those skilled in the art to insure a fermentation of the sugar in the dilute solution of this re-fermentation step in the process. It has been found advisable to acidify the re-fermentation with an acid non-toxic to yeast to a point giving a pH value of 4.0 to 4.5. This improves the filtration and keeps down the growth of undesired organisms.

The friable cake obtained from the filter-press may then be extruded in strings and dried by any of the well-known methods.

If the material is simply dried without filter-pressing, the re-fermentation and the acidification may be omitted.

The flocculating yeast culture which has been found suitable for the purposes of this invention is one in which the flocculating organism is closely associated with the yeast. In the concentrated mashes made up for the purpose of alcohol production, the organism consumes little or no sugar nor does it appear to metabolize alcohol. It is a small gram-positive coccus growing well on media containing peptone, but not on peptone-free malt media nor in molasses mash. In the mixed culture, the micrococci surround or attach themselves to the yeast cells, causing the cells to become agglutinated or to flocculate. They do not in any way impair the strength of the yeast.

The following data is given of the micro-organism, cultures of which have been employed:

Minute cocci, occurring in clumps.
Gram positive.
On agar plates—colonies are whitish, round, about 2-3 mm. in diameter.
Nutrient broth—abundant growth, turbidity and sedimentation.
Litmus milk—acid, no curd, no proteolysis.
Glucose broth—acid, no gas.
Lactose broth—acid, no gas.
Sucrose broth—acid, no gas.
Gelatine not liquefied.
Nitrates reduced.
Acetyl methyl carbinol not produced.

The organism belongs to a general type and closely related varieties may show some variation in characteristics. The organism appears to be closely related to the common *Staphylococcus albus* and *Staphylococcus candidus*, and to agree well with the descriptions of an organism which has been variously named in the literature as *Staphylococcus epidermidis*, *Staphylococcus cerevisœ*, etc.

I claim:

1. A process which comprises fermenting an alcohol fermentation solution with a flocculating culture of yeast and the herein described micro-organism benign to yeast, allowing the flocculating yeast and suspended solids to settle at the bottom, withdrawing the solution thus substantially freed of yeast and solids for alcohol recovery operations, removing the residue containing the flocculated yeast, and dehydrating the same to obtain a mixed product suitable for utilization for food or fertilizer.

2. A process which comprises fermenting a concentrated fermentation solution with a flocculating culture of yeast and the herein described micro-organism benign to yeast, allowing the flocculated yeast and suspended solids to settle at the bottom, withdrawing the solution thus substantially freed of yeast and solids for alcohol recovery operations, removing the residue containing the flocculated yeast, re-fermenting this residue in a dilute sugar solution, filtering the re-fermented residue so as to obtain a friable cake, and treating the material of the cake to obtain a dried mixed product suitable for utilization for food or fertilizer.

3. A process which comprises fermenting an alcohol fermentation solution with a flocculating culture of yeast and the herein described micro-organism benign to yeast, allowing the flocculated yeast and suspended solids to settle at the bottom, and withdrawing the solution thus substantially freed of yeast and solids for alcohol recovery operations.

4. A process for the recovery of yeast and solids from alcohol fermentations in concentrated solutions, which comprises fermenting the solution with a flocculating culture of yeast associated with the herein described micro-organism benign to yeast, thereby obtaining a thorough settling of the yeast and suspended solids, and removing and drying this material.

5. A process for the recovery of yeast and solids as set forth in claim 2, in which the settled-out residue from the concentrated alcoholic fermentation is re-fermented in a dilute sugar solution, as a preliminary to dehydration by filtering.

6. A process for the recovery of yeast and solids from alcohol fermentation solutions as set forth in claim 2, in which the settled-out residue is re-fermented in a dilute sugar solution acidified to give a pH value between 4.0 and 4.5.

7. A process for the recovery of yeast and solids from alcohol fermentation solutions involving the following steps: fermenting the solution with a flocculating yeast, and re-fermenting the settled-out residue in a relatively dilute sugar solution, the re-fermentation solution being acidified with an acid non-toxic to yeast to a point giving pH value between 4.0 and 4.5.

8. A stock or chicken food, comprising the concentrated and dried residue of a concentrated cane molasses fermentation solution fermented with a flocculating yeast culture, said residue containing the yeast used in the fermentation of such solution.

9. A stock or chicken food, comprising the concentrated and dried residue of an alcohol fermentation solution fermented with a flocculating yeast culture, said residue containing the yeast used in the fermentation of such solution.

10. A stock or chicken food, comprising the concentrated and dried residue of an alcohol fermentation solution fermented with a flocculating yeast culture, the nitrogen content of such composition being upwards of about five per cent.

11. A fertilizer, comprising the concentrated and dried residue of a cane molasses fermentation solution fermented with a flocculating yeast culture, said residue containing the yeast used in the fermentation of such solution.

FRANK M. HILDEBRANDT.